(12) United States Patent
Ezaki

(10) Patent No.: US 7,823,551 B2
(45) Date of Patent: Nov. 2, 2010

(54) VALVE TRAIN FOR INTERNAL COMBUSTION ENGINE

(75) Inventor: Shuichi Ezaki, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 567 days.

(21) Appl. No.: 11/794,573

(22) PCT Filed: Feb. 20, 2006

(86) PCT No.: PCT/JP2006/303511

§ 371 (c)(1),
(2), (4) Date: Jul. 2, 2007

(87) PCT Pub. No.: WO2006/098133

PCT Pub. Date: Sep. 21, 2006

(65) Prior Publication Data

US 2009/0277407 A1    Nov. 12, 2009

(30) Foreign Application Priority Data

Feb. 23, 2005  (JP) ............................. 2005-047051

(51) Int. Cl.
F01L 1/34 (2006.01)
(52) U.S. Cl. .................. 123/90.16; 123/90.15
(58) Field of Classification Search .............. 123/90.15, 123/90.16
See application file for complete search history.

(56) References Cited

U.S. PATENT DOCUMENTS

2002/0189576 A1 * 12/2002 Wildner ................... 123/198 F

FOREIGN PATENT DOCUMENTS

| DE | 198 25 964 A1 | 12/1999 |
|---|---|---|
| JP | 52 61636 | 5/1977 |
| JP | 2 27123 | 7/1990 |
| JP | 10 47028 | 2/1998 |
| JP | 2000 337183 | 12/2000 |
| JP | 2001 329874 | 11/2001 |
| JP | 2002 309977 | 10/2002 |
| JP | 2003 170764 | 6/2003 |
| JP | 2003 254103 | 9/2003 |
| JP | 2004 183610 | 7/2004 |

OTHER PUBLICATIONS

U.S. Appl. No. 11/597,563, Ezaki, et al.

* cited by examiner

Primary Examiner—Zelalem Eshete
(74) Attorney, Agent, or Firm—Oblon, Spivak, McClelland, Maier & Neustadt, L.L.P.

(57) ABSTRACT

A valve train for an internal combustion engine that uses motors to open/close intake valves of cylinders. The motors drive the intake valves for each of a plurality of groups of cylinders that perform an explosion stroke at substantially equal crank angle intervals. Since the intake valves are driven for each of the plurality of groups of cylinders that perform an explosion stroke at substantially equal crank angle intervals, the explosion stroke is performed regularly even when an operation is conducted with only a particular group of cylinders. This makes it possible to inhibit driveability deterioration.

11 Claims, 7 Drawing Sheets ignition order #1-#3-#4-#2

Control group(1):#1-#4

Control group(2):#2-#3 ignition order
1-#2-#3-#4-#5-#6

Control group(1):#1-#3-#5

Control group(2):#2-#4-#6

VALVE TRAIN FOR INTERNAL COMBUSTION ENGINE

TECHNICAL FIELD

The present invention relates to a valve train for an internal combustion engine.

BACKGROUND ART

A known technology described, for instance, in JP-A No. 183610/2004, uses electric motors to drive an intake valve and exhaust valve for each cylinder.

However, if the above technology, which uses electric motors to drive the intake valve and exhaust valve for each cylinder, is employed, it is anticipated that, for example, the electric motors or sensors for detecting the rotational position of the electric motors may become faulty. If an internal combustion engine is continuously operated by using normal cylinders only, the explosion stroke becomes irregular, thereby changing the rotary torque. This causes deteriorated driveability or makes it difficult to continue operating the internal combustion engine.

The present invention has been made to solve the above problem. It is an object of the present invention to carry out the explosion stroke regularly and prevent driveability from deteriorating in a situation where the internal combustion engine is not operated with all cylinders.

DISCLOSURE OF INVENTION

The first aspect of the present invention is achieved by a valve train for an internal combustion engine which includes a plurality of motors for opening/closing valve discs of cylinders. The plurality of motors drive the valve discs for each of a plurality of groups of cylinders that perform an explosion stroke at substantially equal crank angle intervals.

The valve disc is driven for each of the plurality of cylinder groups in which the explosion stroke is performed for each of the crank angles spaced at substantially equal intervals. Therefore, even if an operation is conducted by only cylinders belonging to a particular group, the explosion stroke is not performed irregularly. As a result, the deterioration of driveability can be suppressed.

In an second aspect of the present invention, in the valve train for an internal combustion engine improved as described above, each of the plurality of motors may drive only the valve discs for cylinders of one of the plurality of groups.

Each of the plurality of motors drives only the valve disc for cylinders in one group. Therefore, each motor does not drive the valve disc for cylinders in two or more groups. Consequently, it is possible to drive only the valve discs for cylinders belonging to a particular group and completely stop the valve discs for cylinders belonging to the other groups.

In a third aspect of the present invention, in the valve train for an internal combustion engine improved as described above, when a particular cylinder becomes abnormal, at least the valve discs for all cylinders of a group to which the abnormal cylinder belongs may be stopped.

If a particular cylinder becomes abnormal, at least the valve discs for all cylinders of a group to which the abnormal cylinder belongs are brought to a stop. Therefore, the explosion stroke can be performed at substantially equal intervals by the cylinders in the other groups for which the valve discs are continuously driven. This makes it possible to continuously conduct an operation with normal cylinders only and properly inhibit driveability deterioration.

In a fourth aspect of the present invention, in the valve train for an internal combustion engine improved as described above, when there are a plurality of group configuration options, the plurality of motors may drive the valve discs for every group that has a decreased number of cylinders.

If a plurality of group configuration options exist, the valve discs are driven for each group in which the number of cylinders decreases. This makes it possible to decrease an output that is generated when an operation is conducted with only cylinders of a particular group due to the occurrence of an abnormality. Consequently, a driver can become aware of the occurrence of an abnormality.

In a fifth aspect of the present invention, in the valve train for an internal combustion engine improved as described above, when there are a plurality of group configuration options, the plurality of motors may drive the valve discs for every group that has an increased number of cylinders.

If a plurality of group configuration options exist, the valve discs are driven for each group in which the number of cylinders increases. This makes it possible to increase an output that is generated when an operation is conducted with only cylinders of a particular group due to the occurrence of an abnormality. Consequently, an operation can be conducted as if no abnormality exists.

In a sixth aspect of the present invention, in the valve train for an internal combustion engine improved as described above, when an operation is to be conducted with a reduced number of cylinders, only the valve discs for all cylinders of a particular group may be driven, whereas the valve discs for cylinders of the other groups may be stopped.

When an operation is to be conducted with a reduced number of cylinders, only the valve discs for all cylinders of a particular group are driven. Therefore, the explosion stroke can be performed at substantially equal intervals. This makes it possible to inhibit driveability deterioration while an operation is conducted with a reduced number of cylinders.

In a seventh aspect of the present invention, in the valve train for an internal combustion engine improved as described above, the stopped valve discs may be fully closed.

Since the undriven valve disc is fully closed, the pumping loss in a stopped cylinder can be minimized. Further, a low-temperature air flow in an exhaust path can be inhibited. This makes it possible to inhibit the temperature of an exhaust purification catalyst from decreasing.

The eighth aspect of the present invention is achieved by a valve train for an internal combustion engine that uses a plurality of motors to open/close valve discs of cylinders. A valve driving means that is capable of driving the valve discs for a particular cylinder independently of the valve discs for the other cylinders is provided. The number of cylinders used for combustion changes in a stepwise fashion in accordance with the operating state of an internal combustion engine.

Since the number of cylinders used for combustion changes in a stepwise fashion, the torque can be smoothly changed when the number of cylinders is increased or decreased. This makes it possible to provide improved driveability.

In a ninth aspect of the present invention, in the valve train for an internal combustion engine improved as described above, the number of cylinders used for combustion may change in a discontinuous manner at the time of rapid acceleration or rapid deceleration.

Since the number of cylinders used for combustion changes in a discontinuous manner at the time of rapid acceleration or rapid deceleration, the number of cylinders used for combustion can be instantaneously changed in compliance with an acceleration/deceleration request.

In a tenth aspect of the present invention, in the valve train for an internal combustion engine improved as described above, the valve driving means may close the valve discs for cylinders that is not used for combustion.

As the valve disc for cylinders that is not used for combustion closes, the occurrence of a pumping loss can be suppressed. Further, since unnecessary valve disc motions are avoided, the power consumption of the motor can be reduced to provide enhanced system efficiency.

In a eleventh aspect of the present invention, in the valve train for an internal combustion engine improved as described above, the valve driving means may change the lift amount, operating angle, or open/close timing of the valve discs. When the number of cylinders used for combustion decreases, the valve discs may be driven to decrease an intake air amount immediately before a decrease in the number of cylinders and increase the intake air amount immediately after the decrease in the number of cylinders. When the number of cylinders used for combustion increases, the valve discs may be driven to increase the intake air amount immediately before an increase in the number of cylinders and decrease the intake air amount immediately after the increase in the number of cylinders.

Since the intake air amount is controlled immediately before and immediately after an increase/decrease in the number of cylinders, it is possible to avoid an abrupt torque change when the number of cylinders increases or decreases. Consequently, good driveability can be provided when the number of cylinders changes.

In a twelfth aspect of the present invention, in the valve train for an internal combustion engine improved as described above, if an explosion stroke is performed at unequal intervals when the number of cylinders used for combustion is changed, the valve driving means may change the lift amount, operating angle, or open/close timing of the valve discs for a cylinder that performs an explosion stroke immediately before a deactivated cylinder, thereby ensuring that the intake air amount for the former cylinder may be larger than that for the other cylinders.

If the explosion stroke is performed at unequal intervals, the intake air amount is relatively increased for a cylinder whose explosion stroke is performed immediately before a cylinder whose combustion is stopped. Therefore, it is possible to inhibit the torque from temporarily decreasing during a period during which the explosion stroke is performed at long intervals. Consequently, the torque becomes leveled even when the explosion stroke is performed at unequal intervals. This makes it possible to provide good driveability.

In a thirteenth aspect of the present invention, in the valve train for an internal combustion engine improved as described above, when a V-type eight-cylinder internal combustion engine conducts a six-cylinder operation by deactivating the third and second cylinders, the intake air amount for the fourth and seventh cylinders may be made larger than that for the other cylinders.

In the V-type eight-cylinder internal combustion engine, the explosion stroke for the fourth cylinder is performed before the explosion stroke for the third cylinder, and the explosion stroke for the seventh cylinder is performed before the explosion stroke for the second cylinder. Therefore, a relative increase in the intake air amount for the fourth and seventh cylinders makes it possible to level the torque even when the combustions of the third and second cylinders are stopped.

In a fourteenth aspect of the present invention, in the valve train for an internal combustion engine improved as described above, when a V-type six-cylinder internal combustion engine conducts a four-cylinder operation by deactivating the third and sixth cylinders, the intake air amount for the second and fifth cylinders may be made larger than that for the other cylinders.

In the V-type six-cylinder internal combustion engine, the explosion stroke for the second cylinder is performed before the explosion stroke for the third cylinder, and the explosion stroke for the fifth cylinder is performed before the explosion stroke for the sixth cylinder. Therefore, a relative increase in the intake air amount for the second and fifth cylinders makes it possible to level the torque even when the combustions of the third and sixth cylinders are stopped.

In a fifteenth aspect of the present invention, in the valve train for an internal combustion engine improved as described above, when an inline four-cylinder internal combustion engine conducts a three-cylinder operation by deactivating the third cylinder, the intake air amount for the first cylinder may be made larger than that for the other cylinders.

In the inline four-cylinder internal combustion engine, the explosion stroke for the first cylinder is performed before the explosion stroke for the third cylinder. Therefore, a relative increase in the intake air amount for the first cylinder makes it possible to level the torque even when the combustion of the third cylinder is stopped.

BEST MODE FOR CARRYING OUT THE INVENTION

First Embodiment

Figure 1:
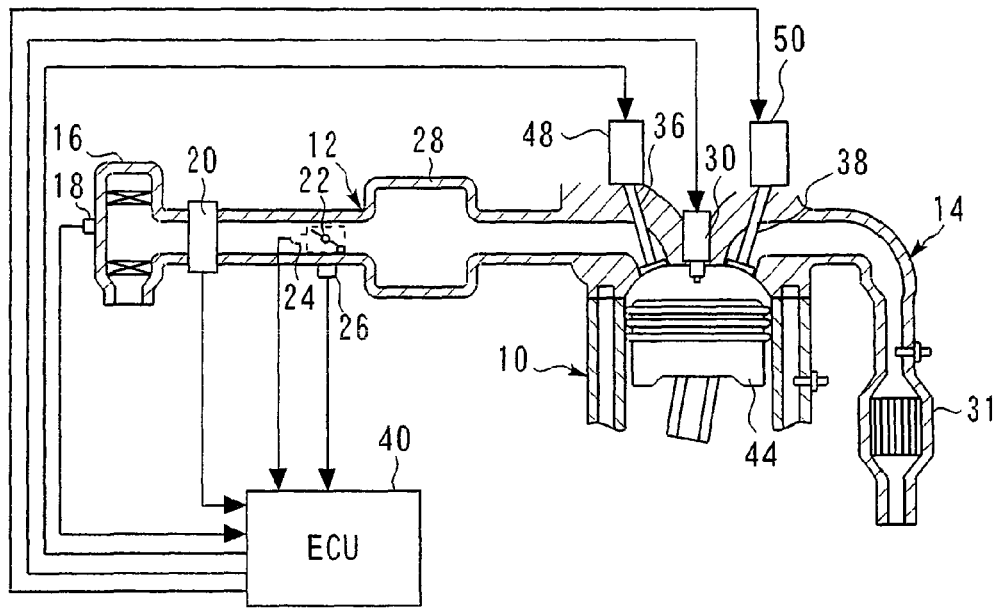
FIG. 1 is a schematic diagram illustrating the configuration of a system that includes a valve train for an internal combustion engine according to the preferred embodiments of the present invention.

For a better understanding of the present invention, preferred embodiments of the present invention will now be described with reference to the accompanying drawings. Like elements in the drawings are designated by like reference numerals and will not be described repeatedly. Further, it should be understood that the present invention is not limited to the preferred embodiments described below.

First Embodiment

FIG. 1 is a schematic diagram illustrating the configuration of a system that includes a valve train for an internal combustion engine according to the preferred embodiments of the present invention. An internal combustion engine 10 communicates with an intake path 12 and an exhaust path 14. The intake path 12 is provided with an air filter 16, which is positioned at an upstream end. The air filter 16 includes an intake air temperature sensor 18, which detects intake air temperature THA (i.e., outside air temperature). The exhaust path 14 is provided with an exhaust purification catalyst 32.

An air flow meter 20 is positioned downstream of the air filter 16. A throttle valve 22 is positioned downstream of the air flow meter 20. A throttle sensor 24 and an idle switch 26 are positioned near the throttle valve 22. The throttle sensor 24 detects the throttle opening TA. The idle switch 26 turns on when the throttle valve 22 is fully closed. A surge tank 28 is positioned downstream of the throttle valve 22.

The internal combustion engine 10 includes a fuel injection valve 30, which injects fuel into a combustion chamber (in a cylinder). The fuel injection valve 30 may inject fuel toward an intake port. The internal combustion engine 10 also includes an intake valve 36 and an exhaust valve 38. The intake valve 36 is connected to a valve train 48 that drives the intake valve 36. The exhaust valve 38 is connected to a valve train 50 that drives the exhaust valve 38.

An ignition plug is provided in a cylinder of the internal combustion engine to ignite fuel that is sprayed into the combustion chamber. Further, a piston 44 is provided in the cylinder. The piston 44 reciprocates within the cylinder.

As shown in FIG. 1, a control apparatus according to the present embodiment includes an ECU (Electronic Control Unit) 40. The ECU 40 is connected not only to the aforementioned sensors but also to a KCS sensor, which detects a knock, and to various sensors (not shown) for detecting, for instance, the throttle opening, engine speed, exhaust gas temperature, cooling water temperature, lubricating oil temperature, and catalyst bed temperature in order to grasp the operating state of the internal combustion engine 10. The ECU 40 is also connected to actuators and sensors that are provided, for instance, for the aforementioned fuel injection valve 30 and valve trains 48, 50.

Figure 2:
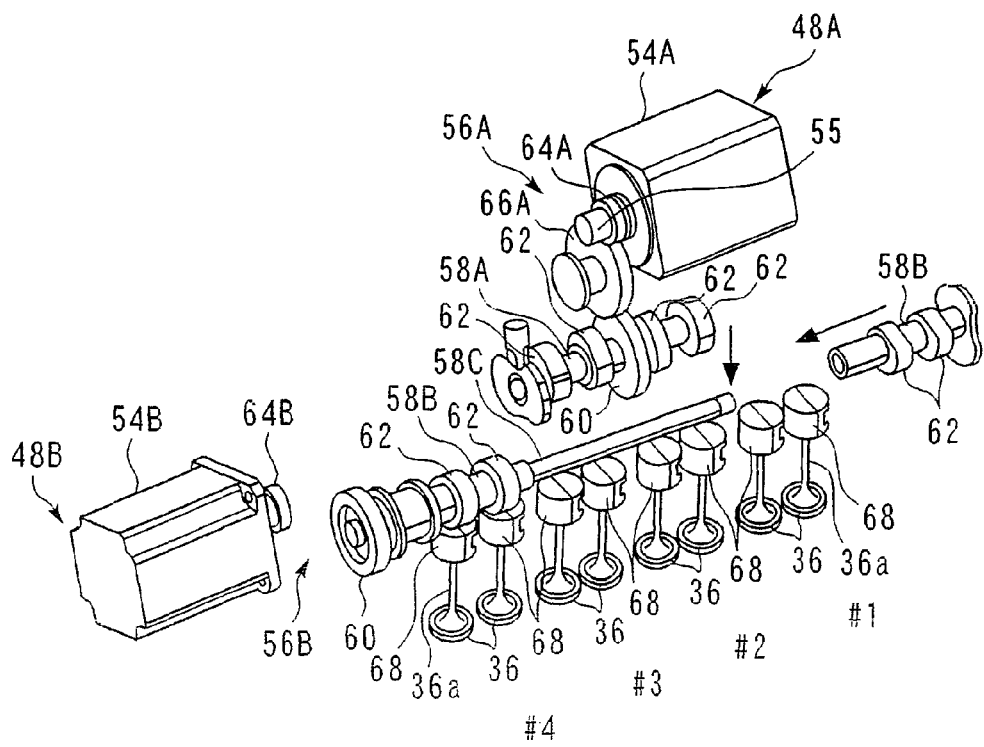
FIG. 2 is a schematic diagram illustrating the configuration of a section around the intake valves and valve train.

FIG. 2 is a schematic diagram illustrating the configuration of a section around the intake valves 36 and valve train 48. It mainly illustrates the configuration of a section around a cylinder head. Although FIG. 2 does not illustrate the exhaust valves 38 and valve train 50, the valve train 50 on the exhaust side has basically the same configuration as the valve train 48 on the intake side. Here it is assumed that each cylinder of the internal combustion engine 10 is equipped with two intake valves 36 and two exhaust valves 38.

The internal combustion engine 10 according to the present embodiment has four cylinders (cylinders #1 to #4). The explosion stroke is sequentially performed in cylinders #1, #3, #4, and #2 in the order named. The valve train 48 includes two trains (valve train 48A and valve train 48B). The valve train 48A drives the intake valves 36 for cylinders #2 and #3. The valve train 48B drives the intake valves for cylinders #1 and #4.

The valve train 48A includes an electric motor (hereinafter referred to as a motor) 54A, which serves as a driving source, a gear train 56A, which serves as a mechanism for transmitting the rotary motion of the motor 54A, and a camshaft 58, which converts the rotary motion transmitted from the gear train to a linear open/close motion of the intake valve 36. Similarly, the valve train 48B includes a motor 54B, a gear train 56B, and a camshaft 58B. The gear train 56B has the same configuration as the gear train 56A.

A DC brushless or like motor whose rotation speed is controllable is used as the motors 54A, 54B. The motors 54A, 54B include a resolver, rotary encoder, or other built-in position sensor that detects their rotational position. A cam drive gear 60 and a cam 62 are installed on the periphery of the camshafts 58A, 58B. The cam drive gear 60 and cam 62 both rotate together with the camshafts 58A, 58B.

The gear train 56A transmits the rotation of a motor gear 64A, which is installed over an output shaft 55 of the motor 54A, to the cam drive gear 60 on the camshaft 58A via an intermediate gear 66A. The gear train 56A may be configured so that the motor gear 64A and cam drive gear 60 rotate at the same speed or configured so that the cam drive gear 60 rotates at a higher speed or at a lower speed than the motor gear 64A. Similarly, the gear train 56B transmits the rotation of a motor gear 64B, which is installed over an output shaft of the motor 54B, to the cam drive gear 60 on the camshaft 58B via an intermediate gear 66B (not shown in FIG. 2).

As shown in FIG. 2, the camshaft 58A is positioned over the intake valves 36 for cylinders #2 and #3. The intake valves 36 for cylinders #2 and #3 are opened/closed by four cams 62 that are installed on the camshaft 58A. The camshaft 58B, which is separated into two sections, is positioned above the intake valves 36 for cylinders #1 and #4. The intake valves 36 for cylinders #1 and #4 are opened/closed by four cams 62 that are installed on the camshaft 58B. The two sections of the camshaft 58B rotate together because they are connected via a coupling member 58C, which is inserted into a through-hole in the center of the camshaft 58A. For the sake of explanation, FIG. 2 shows that the camshaft 58A and the two sections of the camshaft 58B are separated from each other.

Figure 3A:
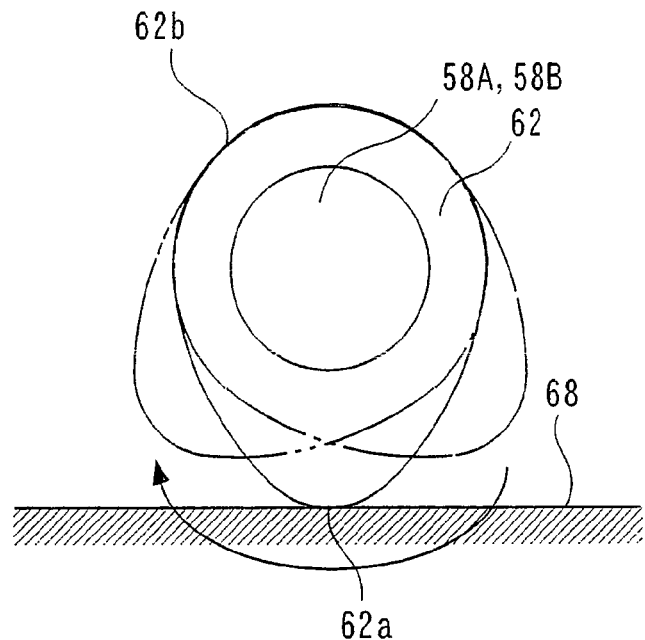
FIGS. 3A and 3B are schematic diagrams illustrating how the intake valve is driven by the cam.
Figure 3B:
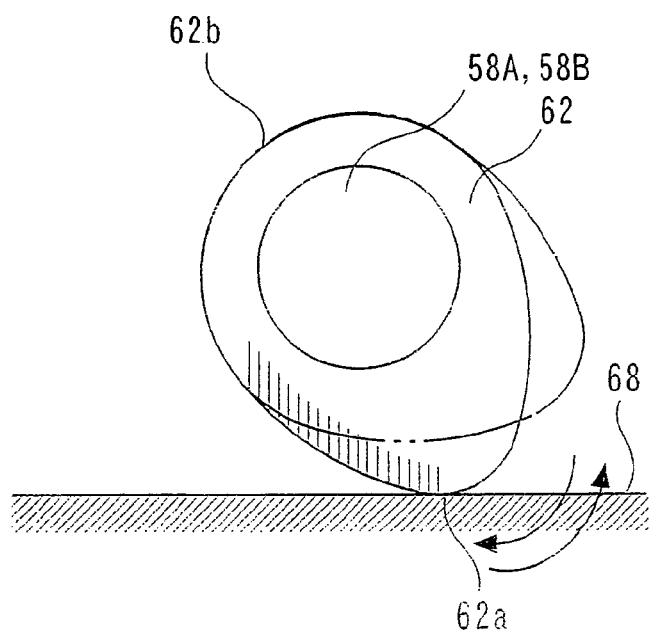

FIGS. 3A and 3B are schematic diagrams illustrating how the intake valve 36 is driven by the cam 62. The cam 62 is formed as a plate cam whose nose 62a is formed by bulging a part of a circular base circle 62b coaxial with the camshafts 58A, 58B outward in radial direction. The cam 62 is profiled so that its entire circumference does not have negative curvature, that is, a convex curve is drawn outward in radial direction.

As shown in FIG. 2, each intake valve 36 includes a valve stem 36a. Each cam 62 faces a retainer 68, which is positioned at one end of the valve stem 36a for the intake valve 36. Compressive reaction force of a valve spring (not shown) pushes each intake valve 36 toward the cam 62. Therefore, if the retainer 68 faces the base circle 62b of the cam 62, the intake valve 36 comes into close contact with a valve sheet (not shown) of the intake port, thereby closing the intake port.

When the rotary motions of the motors 54A, 54B are transmitted to the camshafts 58A, 58B through the gear trains 56A, 56B, the cam 62 rotates together with the camshafts 58A, 58B. The retainer 68 is pressed downward as the nose 62a climbs over the retainer 68. The intake valve 36 then opens/closes against the force of the valve spring.

FIGS. 3A and 3B also indicate two drive modes for the cam 62: normal rotation drive mode and swing drive mode. In the normal rotation drive mode, the motors 54A, 54B continuously rotate in one direction to rotate the cam 62 continuously in the direction of normal rotation (in the direction indicated by the arrow in FIG. 3A) beyond a maximum lift position as indicated in FIG. 3A, that is, a position at which the nose 62a of the cam 62 comes into contact with a mating part (the retainer 68 in this case). In the swing drive mode, on the other hand, the cam 62 is caused to reciprocate as shown in FIG. 3B by changing the rotation direction of the motors 54a, 54B before the maximum lift position for the normal rotation drive mode is reached.

In the normal rotation drive mode, the operating angle of the intake valve 36 is controlled by varying the rotation speed of the cam 62 with respect to crankshaft rotation. In the swing drive mode, the maximum lift amount and operating angle of the intake valve 36 can be controlled by controlling the rotation speed of the cam 62 and swing angle range of the cam 62.

Figure 4:
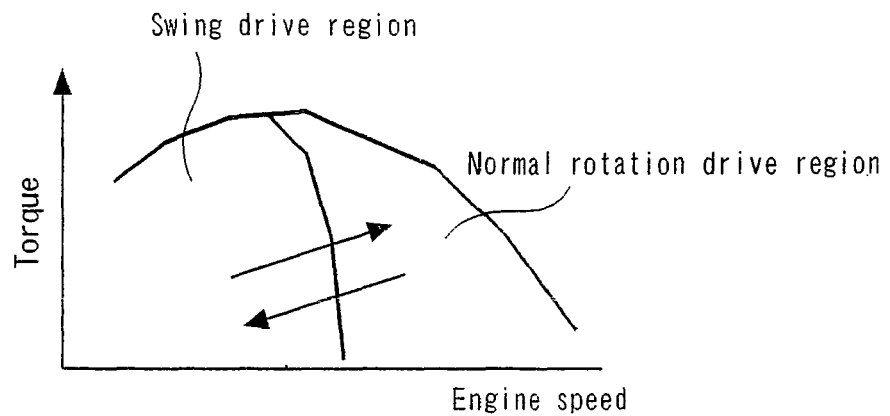
FIG. 4 is a schematic diagram illustrating the relationship among the engine speed and output torque of the internal combustion engine and the drive modes of the cam.

In the manner described above, the intake valve 36 can be driven while the lift amount and operating angle are optimized in accordance with the operating state. FIG. 4 is a schematic diagram illustrating the relationship among the engine speed and output torque of the internal combustion engine 10 and the drive modes of the cam 62. The drive modes of the cam 62 are selectively used in association with the engine speed and output torque. In a low engine speed region, the swing drive mode is basically selected. In a high engine speed region, on the other hand, the normal rotation drive mode is basically selected. Consequently, control is exercised so as to decrease the lift amount and operating angle of the intake valve 36 in the low engine speed region and increase the lift amount and operating angle of the intake valve 36 in the high engine speed region. As a result, an optimum amount of air can be delivered into an engine cylinder in accordance with the engine speed and output torque.

Figure 5:
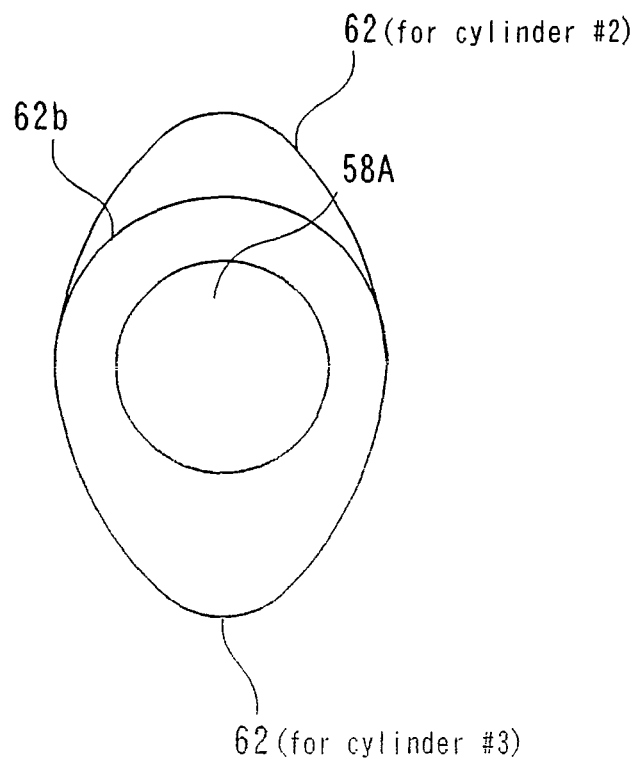
FIG. 5 is a schematic diagram illustrating the details of two different cams that are provided for the camshaft.

FIG. 5 is a schematic diagram illustrating the details of two different cams 62 that are provided for the camshaft 58A. As shown in FIG. 5, the cam 62 for driving the intake valves 36 for cylinder #2 and the cam 62 for driving the intake valves 36 for cylinder #3 are positioned 180 degrees apart. In a four-cylinder internal combustion engine, cylinders #1, #3, #4, and #2 sequentially perform an explosion stroke in the order named over a crank angle of 720°. Therefore, the intake strokes for cylinders #2 and #3 are performed at intervals of 360° crank angle. The valve train 48A rotates or swings the camshaft 58A in such a manner that the cam 62 for cylinder #2 and the cam 62 for cylinder #3 alternately drive the intake valves 36 for cylinder #2 and the intake valves 36 for cylinder #3 at intervals of 360° crank angle. Similarly, the camshaft 58B is provided with two different cams 62 for driving the intake valves 36 for cylinders #1 and #4, and the valve train 48B drives the intake valves 36 for cylinder #1 and the intake valves 36 for cylinder #4 by rotating or swinging the camshaft 58B.

If, in the system configured as described above, the valve trains 48, 50 become faulty, the intake valves 36 and exhaust valves 38 might malfunction. If, for instance, the motors 54A, 54B become faulty and cannot perform a normal rotation operation or swing operation, the position sensors for the motors 54A, 54B become faulty, or the wiring becomes open or otherwise defective, only the intake valves 36 for a particular cylinder might perform an abnormal operation.

In a four-cylinder internal combustion engine, cylinders #1, #3, #4, and #2 sequentially perform an explosion stroke in the order named at intervals of 180° crank angle. If, in this situation, cylinder #3 becomes abnormal and fails to perform its explosion stroke, the explosion stroke is performed at intervals of 360° crank angle between cylinder #1 and cylinder #4 although it should normally be performed at intervals of 180° crank angle. Consequently, crankshaft rotation is affected by torque changes.

If, for instance, the fuel injection valve 30 or ignition plug for a particular cylinder becomes abnormal while the valve trains 48A, 48B are normal, crankshaft rotation might be affected by torque changes because the explosion stroke for the affected cylinder is not performed.

Figure 6:
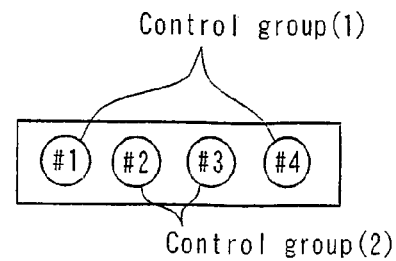
FIG. 6 is a schematic diagram illustrating the control groups of cylinders according to the first embodiment.

Under the above circumstances, the present embodiment divides the four cylinders into two control groups. FIG. 6 is a schematic diagram illustrating the control groups for a situation where there are four cylinders. As indicated in FIG. 6, cylinders #1 and #4 belong to control group (1), whereas cylinders #2 and #3 belong to control group (2).

In the two cylinders belonging to control group (1) or (2), an explosion stroke is performed at equal crank angle intervals (360° in the present embodiment) when the crankshaft makes two revolutions (720°) within one cycle. More specifically, cylinders #1 and #4, which belong to control group (1), perform an explosion stroke at intervals of 360° crank angle when the crankshaft makes two revolutions, and cylinders #2 and #3, which belong to control group (2), perform an explosion stroke at intervals of 360° crank angle when the crankshaft makes two revolutions.

If any particular cylinder becomes faulty, the system according to the present embodiment exercises control to stop the operation of the faulty cylinder and the operation of the other cylinder belonging to a control group to which the faulty cylinder belongs. If, for instance, cylinder #3 becomes faulty, the system stops the operation of cylinder #3 and the operation of cylinder #2, which is the other cylinder belonging to control group (2) to which cylinder #3 belongs, and then continues to conduct an operation with only cylinders #1 and #4, which belong to control group (1).

The occurrence of a fault can be judged depending, for instance, on whether cam angular velocity control is normally exercised in relation to crank angular velocity. More specifically, if the angular velocity of the camshaft is Vcam, it can be judged that a fault has occurred when the following expression is established:

$$|Vcam0-Vcam|>DVx$$

DVx is a characteristic value that is determined in accordance with the maximum permissible levels, for instance, of a torque change and combustion failure of the internal combustion engine 10. Vcam0 is a value that is determined in accordance with the angular velocity Vcrk of the crankshaft. When a speed control variable is a, the expression Vcam0µ Vcrk+a holds true. The angular velocity Vcam of the camshaft is determined in accordance with an output voltage of a position sensor that detects the cam angle.

As regards a cylinder whose operation is to be stopped, the valve trains 48, 50 stop driving the intake valves 36 and exhaust valves 38. If, for instance, cylinder #3 becomes faulty, the motor 54A for the valve train 48A stops. This ensures that the intake valves 36 for cylinders #2 and #3 are not driven. For a cylinder whose operation is to be stopped, it is preferred that the fuel injection by the fuel injection valve 30 and the engine firing by the ignition plug be also stopped. This makes it possible to avoid unnecessary operations in the event of an abnormality.

In the above situation, cylinders #1 and #4, which belong to control group (1), perform an explosion stroke at equal crank angle intervals. Therefore, even if an operation is conducted with only cylinders #1 and #4, the explosion stroke is not performed with irregular timing. Consequently, it is possible to suppress a change in the rotary torque of the crankshaft. Further, even if a particular cylinder becomes abnormal, the internal combustion engine 10 can be operated while minimizing the degree of driveability deterioration.

As described above, a vehicle in which the internal combustion engine 10 is mounted can be continuously operated even if an abnormality occurs. While an operation is conducted by one of the two control groups, it is preferred that an alarm lamp or like device inform a driver of such a situation. When an operation is conducted by only one control group, the driver can recognize the occurrence of a fault because the internal combustion engine 10 reduces its output.

Particularly, in the present embodiment, the motor for driving the intake valves 36 and exhaust valves 38 of cylinders in one control group differs from the motor for driving the cylinder valves in another control group. Therefore, one motor does not drive cylinders in both control groups. This makes it possible to drive only the intake valves 36 and exhaust valves 38 of cylinders in one control group and bring the intake valves 36 and exhaust valves 38 in the other control group to a complete stop.

Further, the system according to the present embodiment can conduct an operation with a reduced number of cylinders, for instance, for low-load driving purposes. When an operation is to be conducted with a reduced number of cylinders, the system stops all the cylinders of control group (1) or (2) and conducts the operation with only the cylinders of the other control group. This ensures that only the cylinders of one control group perform an explosion stroke at equal crank angle intervals. Therefore, even when an operation is to be conducted with a reduced number of cylinders, crankshaft torque changes can be minimized. Further, increased fuel efficiency can be provided by conducting an operation with a reduced number of cylinders.

When an operation is to be conducted with a reduced number of cylinders, it is preferred that control groups (1) and (2) be operated alternately. If only the cylinders of one control group have been operated for an extended period of time before resuming a normal operation with all cylinders, the cylinders of a group that has not been operated may be cooled to deteriorate startability or increase friction. Further, if each cylinder is individually equipped with a catalyst, the catalyst temperature of a cylinder that has not been operated may decrease. It is therefore preferred that control groups (1) and (2) be operated alternately to maintain a catalyst activation temperature.

No matter whether an abnormality exists or an operation is conducted with a reduced number of cylinders, the intake valves 36 and exhaust valves 38 for the two cylinders of a nonoperating group are fully closed. The reason is that if the intake valves 36 and exhaust valves 38 for a nonoperating cylinder are open, the piston 44 moves vertically to cause an air flow in the intake path 12 and exhaust path 14, thereby incurring a pumping loss. When the intake valves 36 and exhaust valves 38 are fully closed, no air flow occurs in the intake path 12 or exhaust path 14. This makes it possible to properly avoid a pumping loss. A valve spring load is exerted on the intake valves 36 and exhaust valves 38. Therefore, when the power supply to the motors 54A, 54B for an abnormal cylinder is shut off in a situation where the torque retained by de-energized motors 54A, 54B is reduced, the intake valves 36 and exhaust valves 38 can be closed by the reaction force of the valve spring.

If the intake valves 36 and exhaust valves 38 for a nonoperating cylinder are open, cool air flows into the exhaust path 14 to lower the temperature of the exhaust purification catalyst 32. When the intake valves 36 and exhaust valves 38 for a nonoperating cylinder are closed, it is possible to inhibit the exhaust purification catalyst 32 from being cooled and properly maintain the exhaust purification catalyst 32 at an activation temperature.

As described above, the first embodiment divides the cylinders of a four-cylinder internal combustion engine into two control groups and ensures that the cylinders of each control group perform an explosion stroke at equal crank angle intervals. Therefore, when a particular cylinder becomes faulty or when an operation is to be conducted with a reduced number of cylinders, the first embodiment can perform an explosion stroke at equal crank angle intervals by conducting an operation with only one of the two control groups. Consequently, the degree of driveability deterioration can be minimized even when an operation is conducted with a limited number of cylinders in a situation where a fault exists or the operation is to be conducted with a reduced number of cylinders.

Second Embodiment

Figure 7:
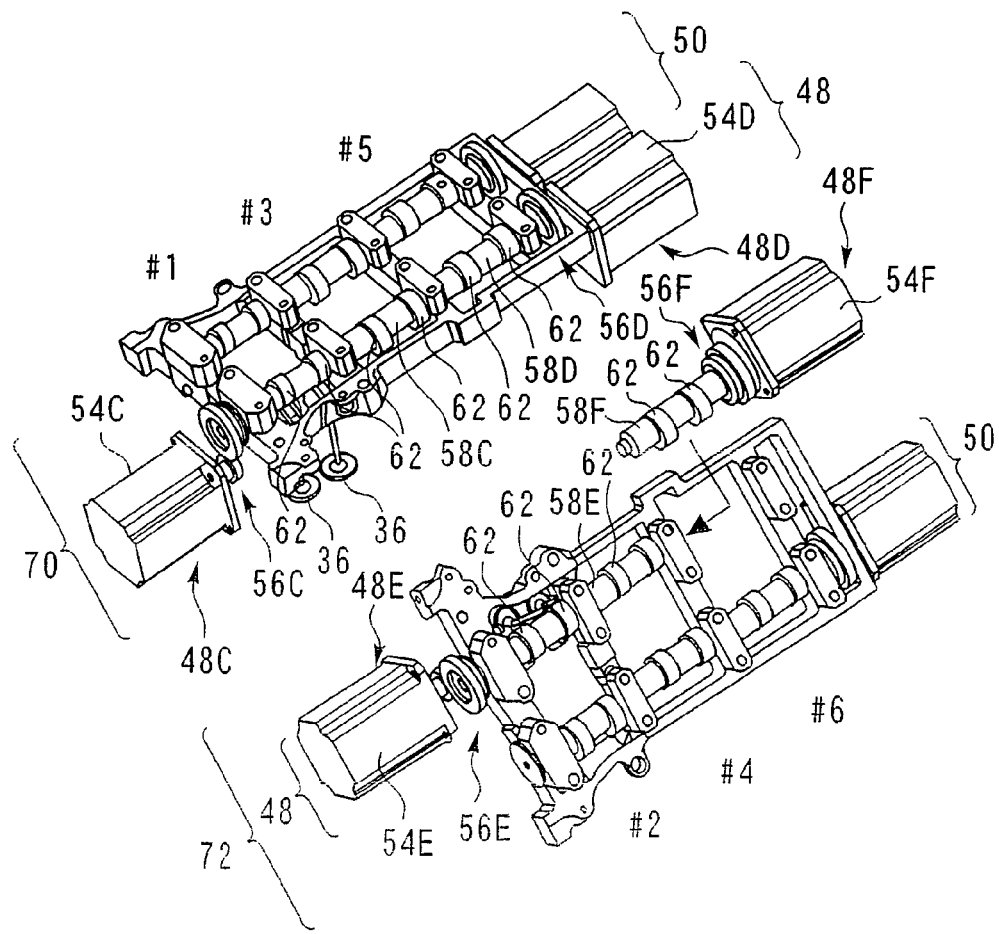
FIG. 7 is a schematic diagram illustrating the configuration of a section around valve trains according to the second embodiment.

A second embodiment of the present invention will now be described. The second embodiment is such that the present invention is applied to a six-cylinder internal combustion engine 10. FIG. 7 is a schematic diagram illustrating the configuration of a section around valve trains 48, 50 according to the second embodiment. It mainly illustrates the configuration of a section around a cylinder head. The internal combustion engine 10 according to the present embodiment is a V-type six-cylinder engine. Cylinders #1, #3, and #5 are positioned in a bank 70, and the remaining three cylinders (cylinders #2, #4, and #6) are positioned in another bank 72.

The banks 70, 72 both include a valve train 48 that drives intake valves 36, and a valve train 50 that drives exhaust valves 38. Here, although the configuration of the valve train 48 is mainly described, the valve train 50 has basically the same configuration as the valve train 48. Here it is assumed that each cylinder of the internal combustion engine 10 is equipped with two intake valves 36 and two exhaust valves 38.

In the V-type six-cylinder internal combustion engine, the explosion stroke is sequentially performed in cylinders #1, #2, #3, #4, #5 and #6 in the order named. The valve train 48 positioned in the bank 70 includes two trains (valve train 48C and valve train 48D). The valve train 48 positioned in the bank 72 includes two trains (valve train 48E and valve train 48F). The valve train 48C drives the intake valves 36 for cylinders #1 and #3. The valve train 48D drives the intake valves 36 for cylinder #5. The valve train 48E drives the intake valves for cylinders #2 and #4. The valve train 48F drives the intake valves 36 for cylinder #6.

As is the case with the first embodiment, the valve trains 48C, 48D, 48E, 48F respectively include motors 54C, 54D, 54E, 54F as their driving sources. In the bank 70, the rotary motion of the motor 54C is transmitted to a camshaft 58C via a gear train 56C. Similarly, the rotary motion of the motor 54D is transmitted to a camshaft 58D via a gear train 56D.

In the bank 72, similarly, the rotary motion of the motor 54E is transmitted to a camshaft 58E via a gear train 56E. Similarly, in the valve train 48F, the rotary motion of the motor 54F is transmitted to a camshaft 58F via a gear train 56F.

In the bank 70, the camshaft 58C is positioned over the intake valves 36 for cylinders #1 and #3. The intake valves 36 for cylinders #1 and #3 are opened/closed by four cams 62 that are installed on the camshaft 58C. The camshaft 58D is positioned above the intake valves 36 for cylinders #5. The intake valves 36 for cylinders #5 are opened/closed by two cams 62 that are installed on the camshaft 58D.

In the bank 72, the camshaft 58E is positioned over the intake valves 36 for cylinders #2 and #4. The intake valves 36 for cylinders #2 and #4 are opened/closed by four cams 62 that are installed on the camshaft 58E. The camshaft 58F is positioned above the intake valves 36 for cylinders #6. The intake valves 36 for cylinders #6 are opened/closed by two cams 62 that are installed on the camshaft 58F.

In the system according to the present embodiment, which is configured as described above, the intake valves 36 of each cylinder are also driven in the normal rotation drive mode or swing drive mode. Therefore, the lift amount and operating angle of each intake valve 36 for each cylinder can be varied freely, as is the case with the first embodiment.

Figure 8:
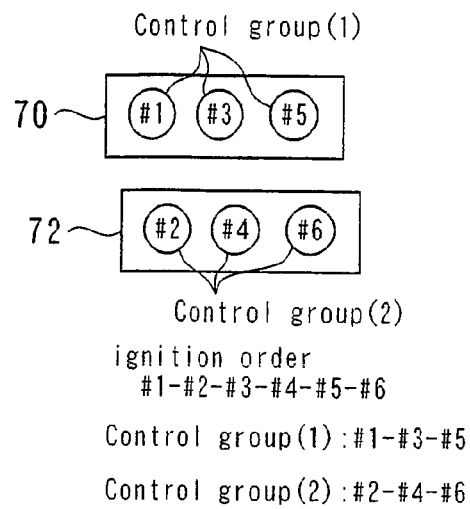
FIG. 8 is a schematic diagram illustrating the control groups of cylinders according to the second embodiment.

FIG. 8 is a schematic diagram illustrating the control groups of cylinders according to the second embodiment. As indicated in FIG. 8, in the system constructed as the V-type six-cylinder internal combustion engine 10 according to the present embodiment, cylinders #1, #3 and #5 belong to control group (1), whereas cylinders #2, #4 and #6 belong to control group (2). In the three cylinders belonging to control group (1) or (2), an explosion stroke is performed at equal crank angle intervals (240° in the present embodiment) when the crankshaft makes two revolutions (720°) within one cycle. More specifically, cylinders #1, #3 and #5, which belong to control group (1), perform an explosion stroke at intervals of 240° crank angle when the crankshaft makes two revolutions, and cylinders #2, #4 and #6, which belong to control group (2), perform an explosion stroke at intervals of 240° crank angle when the crankshaft makes two revolutions.

If any particular cylinder becomes faulty, as is the case with the first embodiment, the system according to the present embodiment exercises control to stop the operation of the faulty cylinder and the operation of the other cylinder belonging to a control group to which the faulty cylinder belongs. If, for instance, cylinder #3 becomes faulty, the system stops the operation of cylinder #3 and the operation of cylinder #1 and #5, which is the other cylinder belonging to control group (1) to which cylinder #3 belongs, and then continues to conduct an operation with only cylinders #2, #4 and #6, which belong to control group (2).

As regards a cylinder whose operation is to be stopped, the valve trains 48, 50 stop driving the intake valves 36 and exhaust valves 38. If, for instance, cylinder #3 becomes faulty, the motor 54C for the valve train 48C and the motor 54D for the valve train 48D stop. This ensures that the intake valves 36 for cylinders #1, #3 and #5 are not driven. For a cylinder whose operation is to be stopped, as is the case with the first embodiment, it is preferred that the fuel injection by the fuel injection valve 30 and the engine firing by the ignition plug be also stopped. This makes it possible to avoid unnecessary operations in the event of an abnormality.

In the above situation, cylinders #2, #4 and #6, which belong to control group (2), perform an explosion stroke at equal crank angle intervals. Therefore, even if an operation is conducted with only cylinders #2, #4 and #6, the explosion stroke is not performed with irregular timing. Consequently, it is possible to suppress a change in the rotary torque of the crankshaft. Further, even if a particular cylinder becomes abnormal, the internal combustion engine 10 can be operated while minimizing the degree of driveability deterioration. Consequently, a vehicle in which the internal combustion engine 10 is mounted can be continuously operated even if an abnormality occurs.

As is the case with the first embodiment, the motor for driving the intake valves 36 and exhaust valves 38 of cylinders in one control group differs from the motor for driving the cylinder valves in another control group. Therefore, one motor does not drive cylinders in both control groups. This makes it possible to drive only the intake valves 36 and exhaust valves 38 of cylinders in one control group and bring the intake valves 36 and exhaust valves 38 in the other control group to a complete stop.

Further, as is the case with the first embodiment, when an operation is to be conducted with a reduced number of cylinders, the system stops all the cylinders of control group (1) or (2) and conducts the operation with only the cylinders of the other control group. This ensures that only the cylinders of one control group perform an explosion stroke at equal crank angle intervals. Therefore, even when an operation is to be conducted with a reduced number of cylinders, crankshaft torque changes can be minimized.

Further, the intake valves 36 and exhaust valves 38 for the cylinders of a nonoperating group are fully closed. This makes it possible to avoid a pumping loss and inhibit the temperature of the exhaust purification catalyst 32 from decreasing.

Figure 9:
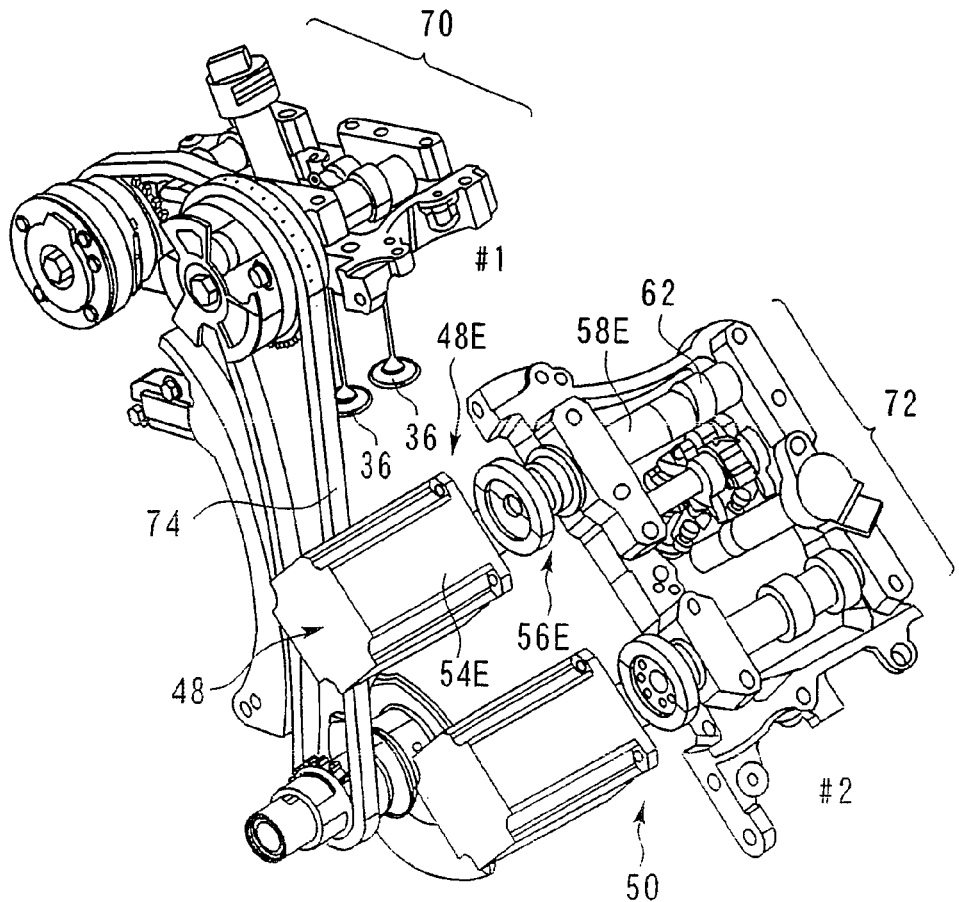
FIG. 9 relates to a V-type six-cylinder internal combustion engine and is a schematic diagram illustrating an example in which a mechanical variable valve mechanism is employed in a bank and the valve trains used electric motors are employed in another bank.

FIG. 9 relates to a V-type six-cylinder internal combustion engine and shows an example in which a mechanical variable valve mechanism is employed to drive the intake valves 36 and exhaust valves 38 of the cylinders in the bank 70 and the valve trains 48, 50 are employed to drive the intake valves 36 and exhaust valves 38 of the cylinders in the bank 72 as is the case with an example shown in FIG. 7. Although FIG. 9 shows only cylinders #1 and #2, the cylinders in the banks 70, 72 are arranged in the same manner as shown in FIG. 7. In the bank 70, the camshaft is driven by a normal timing belt 74.

Even when the mechanical variable valve mechanism drives the intake valves 36 and exhaust valves 38 of the cylinders in one bank 70 as shown in FIG. 9, the cylinders are divided into two control groups (control groups (1) and (2)) as is the case with an example shown in FIG. 8. If a particular cylinder becomes faulty or an operation is to be conducted with a reduced number of cylinders, only one of the two control groups (control group (1) or (2)) is used to conduct an operation. This ensures that when the mechanical variable valve mechanism becomes faulty, the valve trains 48, 50 can operate the cylinders of control group (2), which belongs to the bank 72. If, on the other hand, the valve trains 48, 50 become faulty, the mechanical variable valve mechanism can operate the cylinders of control group (1), which belongs to the bank 70. Consequently, the cylinders in one bank can conduct an operation while crankshaft torque changes are minimized.

If, for instance, the timing belt 74 breaks or other problem occurs while the intake valves 36 for all cylinders are driven by the mechanical variable valve mechanism, all the cylinders come to a stop. However, when the intake valves 36 and exhaust valves 38 in one bank 72 are driven by the valve trains 48, 50 as shown in FIG. 9, the operation can be continuously conducted by operating the cylinders in the bank 72.

When mechanical mechanisms are installed in a mirror arrangement and positioned in two banks of a V-type internal combustion engine in a situation where a mechanical variable valve mechanism is employed to change the operating angle of an intake valve 36 when the lift amount of the intake valve 36 is changed, the two banks differ in the operating angle change that is caused by a lift amount change because the two banks are equal in the rotation direction of a belt-driven or chain-driven camshaft. It means that the two banks may fail to provide the same functionality when the mechanical mechanisms are merely installed in a mirror arrangement. This problem can be suppressed by employing the configuration shown in FIG. 9 because the intake valves 36 in one bank 72 are motor-driven by the valve train 48.

Meanwhile, if cylinders whose explosion stroke is performed at equal crank angle intervals constitute a control group, there is only one control group configuration option for a four-cylinder engine as described in conjunction with the first embodiment. For a six-cylinder engine, however, the cylinders can be divided into three control groups so that, for example, cylinders #1 and #4 belong to control group (1); cylinders #2 and #5 belong to control group (2); and cylinders #3 and #6 belong to control group (3). In this case, too, the cylinders belonging to each control group perform an explosion stroke at equal crank angle intervals (at intervals of 360° in this case) when the crankshaft makes two revolutions. Therefore, operating only the cylinders of one of control groups (1) to (3) makes it possible to inhibit the explosion stroke from being irregularly performed and suppress crankshaft torque changes.

When there are a plurality of control group configuration options as described above, the employed control group configuration is such that each control group has, for instance, a decreased number of cylinders. This ensures that when only the cylinders of one control group are used to conduct an operation, the output can be reduced to let the driver recognize an abnormality when it exists.

When there are a plurality of control group configuration options, the employed control group configuration may be such that each control group has an increased number of cylinders. This ensures that when only the cylinders of one control group are used to conduct an operation, the output can be raised to make the resulting operation equal to a normal operation.

Another alternative would be to configure control groups in the event of an abnormality so as to decrease the number of cylinders of each control group and conduct an operation with only the cylinders of one control group to let the driver recognize the occurrence of the abnormality. To enable the engine to conduct an almost normal operation after a subsequent restart, the control groups may be reconfigured so as to increase the number of cylinders in each control group and conduct an operation with the cylinders of a control group to which an abnormal cylinder does not belong.

As described above, the second embodiment divides the cylinders of a V-type six-cylinder internal combustion engine 10 into two control groups and ensures that the cylinders of each control group perform an explosion stroke at equal crank angle intervals. Therefore, when a particular cylinder becomes faulty or when an operation is to be conducted with a reduced number of cylinders, the second embodiment can perform an explosion stroke at equal crank angle intervals by conducting an operation with only one of the two control groups. Consequently, the degree of driveability deterioration can be minimized even when an operation is conducted with a limited number of cylinders in a situation where a fault exists or the operation is to be conducted with a reduced number of cylinders.

Third Embodiment

Figure 10:
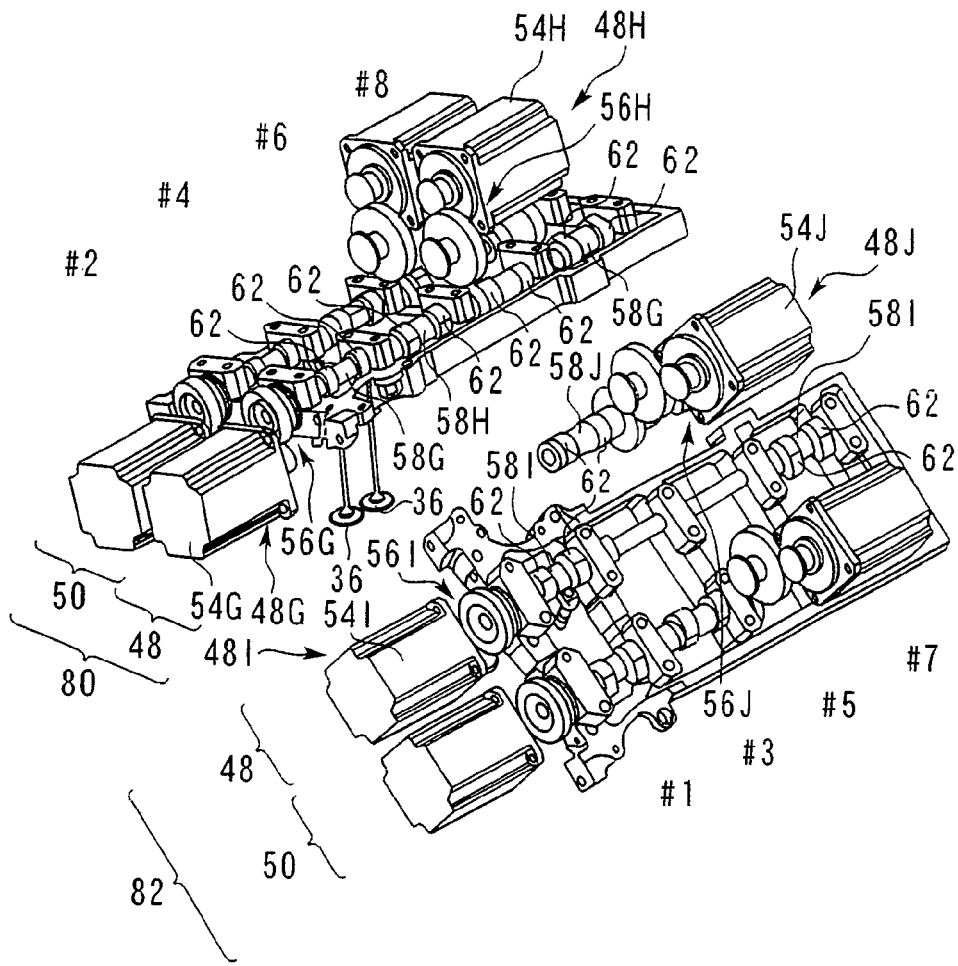
FIG. 10 is a schematic diagram illustrating the configuration of a section around valve trains according to the third embodiment.

A third embodiment of the present invention will now be described. The third embodiment is such that the present invention is applied to an eight-cylinder internal combustion engine 10. FIG. 10 is a schematic diagram illustrating the configuration of a section around valve trains 48, 50 according to the third embodiment. It mainly illustrates the configuration of a section around a cylinder head. The internal combustion engine 10 according to the present embodiment is a V-type eight-cylinder engine. Cylinders #2, #4, #6 and #8 are positioned in a bank 80, and the remaining four cylinders (cylinders #1, #3, #5 and #7) are positioned in another bank 82.

The banks 80, 82 both include a valve train 48 that drives intake valves 36, and a valve train 50 that drives exhaust valves 38. Here, although the configuration of the valve train 48 is mainly described, the valve train 50 has basically the same configuration as the valve train 48. Here it is assumed that each cylinder of the internal combustion engine 10 is equipped with two intake valves 36 and two exhaust valves 38.

In the V-type eight-cylinder internal combustion engine, the explosion stroke is sequentially performed in cylinders #1, #8, #4, #3, #6, #5, #7 and #2 in the order named. The valve train 48 positioned in the bank 80 includes two trains (valve train 48G and valve train 48H). The valve train 48 positioned in the bank 82 includes two trains (valve train 48I and valve train 48J). The valve train 48G drives the intake valves 36 for cylinders #2 and #8. The valve train 48H drives the intake valves 36 for cylinder #4 and #6. The valve train 48I drives the intake valves for cylinders #1 and #7. The valve train 48J drives the intake valves 36 for cylinder #3 and #5.

As is the case with the first embodiment, the valve trains 48G, 48H, 48I, 48J respectively include motors 54G, 54H, 54I, 54J as their driving sources. In the bank 80, the rotary motion of the motor 54G is transmitted to a camshaft 58G via a gear train 56G. Similarly, the rotary motion of the motor 54H is transmitted to a camshaft 58H via a gear train 56H.

In the bank 82, similarly, the rotary motion of the motor 54I is transmitted to a camshaft 58I via a gear train 56I. Similarly, the rotary motion of the motor 54J is transmitted to a camshaft 58J via a gear train 56J.

In the bank 80, the camshaft 58G, which is separated into two sections, is positioned above the intake valves 36 for cylinders #2 and #8. The intake valves 36 for cylinders #2 and #8 are opened/closed by four cams 62 that are installed on the camshaft 58G. The two sections of the camshaft 58G rotate together because they are connected via a coupling member that is inserted into a through-hole in the center of the camshaft 58H. The camshaft 58H is positioned over the intake valves 36 for cylinders #4 and #6. The intake valves 36 for cylinders #4 and #6 are opened/closed by four cams 62 that are installed on the camshaft 58H.

In the bank 82, the camshaft 58I, which is separated into two sections, is positioned above the intake valves 36 for cylinders #1 and #7. The intake valves 36 for cylinders #1 and #7 are opened/closed by four cams 62 that are installed on the camshaft 58I. The two sections of the camshaft 58I rotate together because they are connected via a coupling member that is inserted into a through-hole in the center of the camshaft 58J. The camshaft 58J is positioned over the intake valves 36 for cylinders #3 and #5. The intake valves 36 for cylinders #3 and #5 are opened/closed by four cams 62 that are installed on the camshaft 58J.

In the system according to the present embodiment, which is configured as described above, the intake valves 36 of each cylinder are also driven in the normal rotation drive mode or swing drive mode. Therefore, the lift amount and operating angle of each intake valve 36 for each cylinder can be varied freely, as is the case with the first embodiment.

Figure 11:
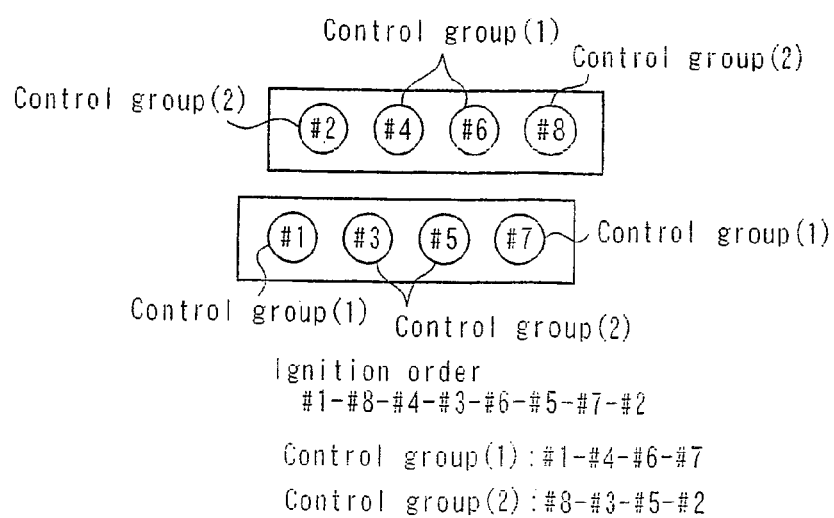
FIG. 11 is a schematic diagram illustrating the control groups of cylinders according to the third embodiment.

FIG. 11 is a schematic diagram illustrating the control groups of cylinders according to the third embodiment. As indicated in FIG. 11, in the system constructed as the V-type eight-cylinder internal combustion engine 10 according to the present embodiment, cylinders #1, #4, #6 and #7 belong to control group (1), whereas cylinders #2, #3, #5 and #8 belong to control group (2). In the four cylinders belonging to control group (1) or (2), an explosion stroke is performed at equal crank angle intervals (180° in the present embodiment) when the crankshaft makes two revolutions (720°) within one cycle.

More specifically, cylinders #1, #4, #6 and #7, which belong to control group (1), perform an explosion stroke at intervals of 180° crank angle when the crankshaft makes two revolutions, and cylinders #2, #3, #5 and #8, which belong to control group (2), perform an explosion stroke at intervals of 180° crank angle when the crankshaft makes two revolutions.

If any particular cylinder becomes faulty, as is the case with the first embodiment, the system according to the present embodiment exercises control to stop the operation of the faulty cylinder and the operation of the other cylinder belonging to a control group to which the faulty cylinder belongs. If, for instance, cylinder #3 becomes faulty, the system stops the operation of cylinder #3 and the operation of cylinder #2, #5 and #8, which is the other cylinder belonging to control group (2) to which cylinder #3 belongs, and then continues to conduct an operation with only cylinders #1, #4, #6 and #7, which belong to control group (1).

As regards a cylinder whose operation is to be stopped, the valve trains 48, 50 stop driving the intake valves 36 and exhaust valves 38. If, for instance, cylinder #3 becomes faulty, the motor 54G for the valve train 48G and the motor 54J for the valve train 48J stop. This ensures that the intake valves 36 for cylinders #2, #3, #5 and #8 are not driven. For a cylinder whose operation is to be stopped, as is the case with the first embodiment, it is preferred that the fuel injection by the fuel injection valve 30 and the engine firing by the ignition plug be also stopped. This makes it possible to avoid unnecessary operations in the event of an abnormality.

In the above situation, cylinders #1, #4, #6 and #7, which belong to control group (1), perform an explosion stroke at equal crank angle intervals. Therefore, even if an operation is conducted with only cylinders #1, #4, #6 and #7, the explosion stroke is not performed with irregular timing. Consequently, it is possible to suppress a change in the rotary torque of the crankshaft. Further, even if a particular cylinder becomes abnormal, the internal combustion engine 10 can be operated while minimizing the degree of driveability deterioration. Consequently, a vehicle in which the internal combustion engine 10 is mounted can be continuously operated even if an abnormality occurs.

As is the case with the first embodiment, the motor for driving the intake valves 36 and exhaust valves 38 of cylinders in one control group differs from the motor for driving the cylinder valves in another control group. Therefore, one motor does not drive cylinders in both control groups. This makes it possible to drive only the intake valves 36 and exhaust valves 38 of cylinders in one control group and bring the intake valves 36 and exhaust valves 38 in the other control group to a complete stop.

Further, as is the case with the first embodiment, when an operation is to be conducted with a reduced number of cylinders, the system stops all the cylinders of control group (1) or (2) and conducts the operation with only the cylinders of the other control group. This ensures that only the cylinders of one control group perform an explosion stroke at equal crank angle intervals. Therefore, even when an operation is to be conducted with a reduced number of cylinders, crankshaft torque changes can be minimized.

Further, the intake valves 36 and exhaust valves 38 for the cylinders of a nonoperating group are fully closed. This makes it possible to avoid a pumping loss and inhibit the temperature of the exhaust purification catalyst 32 from decreasing.

For an eight-cylinder engine, the cylinders can be divided into four control groups so that, for example, cylinders #1 and #6 belong to control group (1); cylinders #8 and #5 belong to control group (2); cylinders #4 and #7 belong to control group (3); and cylinders #3 and #2 belong to control group (4). In this case, too, the cylinders belonging to each control group perform an explosion stroke at equal crank angle intervals (at intervals of 360° in this case) when the crankshaft makes two revolutions. Therefore, operating only the cylinders of one of control groups (1) to (4) makes it possible to inhibit the explosion stroke from being irregularly performed and suppress crankshaft torque changes.

As described above, the third embodiment divides the cylinders of a V-type eight-cylinder internal combustion engine 10 into two control groups and ensures that the cylinders of each control group perform an explosion stroke at equal crank angle intervals. Therefore, when a particular cylinder becomes faulty or when an operation is to be conducted with a reduced number of cylinders, the third embodiment can perform an explosion stroke at equal crank angle intervals by conducting an operation with only one of the two control groups. Consequently, the degree of driveability deterioration can be minimized even when an operation is conducted with a limited number of cylinders in a situation where a fault exists or the operation is to be conducted with a reduced number of cylinders.

The foregoing embodiments assume that the present invention is applied to a four-cylinder, six-cylinder, or eight-cylinder internal combustion engine 10. However, even when the internal combustion engine 10 has a different number of cylinders, an appropriate control group configuration may be formed in a similar manner so that an explosion stroke can be performed at equal crank angle intervals in a situation where an operation is conducted with only a limited number of cylinders. The present invention can be applied to various cylinder arrangements such as inline type, V type, and horizontally opposed type arrangements.

Fourth Embodiment

Figure 12:
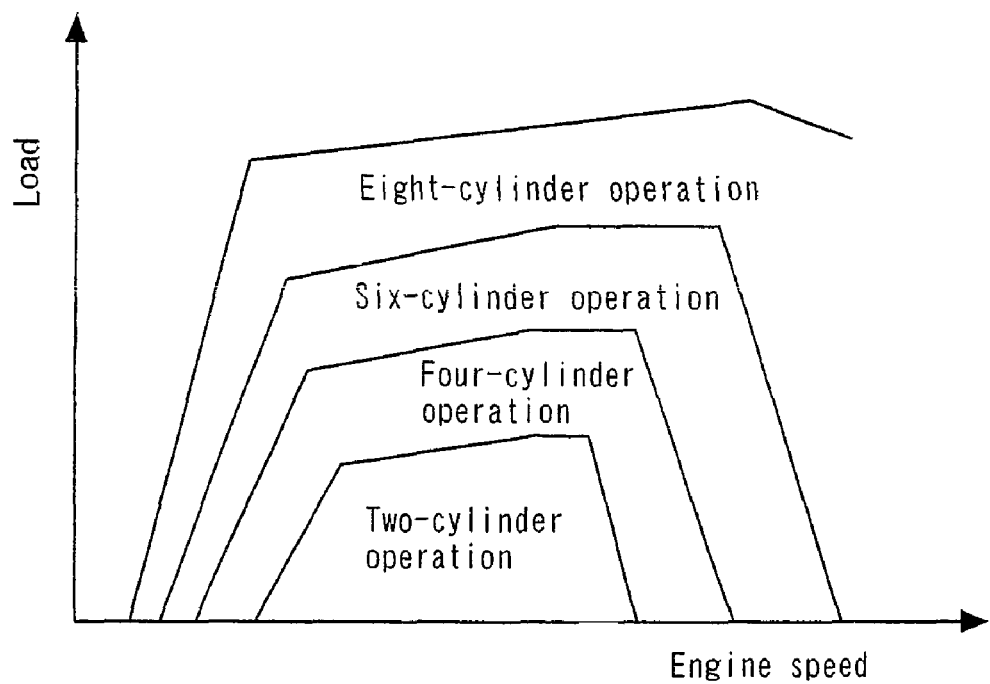
FIG. 12 is a schematic diagram illustrating how the fourth embodiment exercises control.

A fourth embodiment of the present invention will now be described. The valve train configuration for the fourth embodiment of an internal combustion engine is the same as for the foregoing embodiments. FIG. 12 is a schematic diagram illustrating how the fourth embodiment exercises control. As shown in FIG. 12, the present embodiment changes the number of inactive cylinders (whose combustion is stopped) in accordance with the engine speed and load. If an eight-cylinder internal combustion engine 10 is used, combustion occurs in all the eight cylinders while an operation is conducted at a high engine speed and in a high-load region. As the engine speed and load decrease, a six-cylinder operation, four-cylinder operation, and two-cylinder operation are sequentially conducted in the order named. When the number of cylinders in which an explosion stroke is performed is gradually reduced, as described above, in accordance with a decrease in the engine speed and load, the torque can be smoothly changed during a process for increasing/decreasing the number of combustion cylinders. This makes it possible to provide improved driveability. Further, as combustion occurs only in a minimum number of cylinders, enhanced fuel efficiency can be achieved. Therefore, the degree of a torque change that occurs at the time of switching can be greatly decreased when compared to a situation where the engine switches, for instance, from an eight-cylinder operation to a four-cylinder operation.

If acceleration or deceleration is to be rapidly performed, it is preferred that the number of combustion cylinders be changed in a discontinuous manner to instantly switch to a target number of cylinders. If, for instance, rapid acceleration is to be performed during a four-cylinder operation, control should be exercised to instantly switch to an eight-cylinder operation without conducting a six-cylinder operation.

If the number of combustion cylinders changes while control is exercised as described above, the torque slightly changes. It is therefore anticipated that the torque of the internal combustion engine 10 may slightly change when the number of cylinders changes. For example, an eight-cylinder operation produces more torque than a six-cylinder operation. Therefore, if the number of cylinders is increased or decreased to switch between an eight-cylinder operation and a six-cylinder operation, it is anticipated that the torque may slightly change when the number of cylinders is increased or decreased.

Under the above circumstances, the present embodiment controls the lift amount, operating angle, and open/close timing of the intake valves 36 before and after an increase or decrease in the number of cylinders for the purpose of suppressing a torque change that may be caused by a change in the number of cylinders. The valve train configuration according to the present embodiment is the same as the configuration according to the foregoing embodiments. Therefore, the intake valves 36 can be driven while the lift amount, operating angle, and open/close timing are optimized in accordance with the operating state.

When, for instance, the engine is to switch from an eight-cylinder operation to a six-cylinder operation, the intake valves 36 are controlled during the eight-cylinder operation so that the intake air amount decreases with a decrease in the engine speed and load. This makes it possible to reduce the torque immediately before switching to the six-cylinder operation. Consequently, when the engine further reduces its engine speed and load to switch to the six-cylinder operation, a torque change can be suppressed.

Immediately after switching to the six-cylinder operation, the intake valves 36 are controlled so that the intake air amount is larger than usual. This makes it possible to sufficiently increase the torque immediately after switching to the six-cylinder operation. Consequently, a torque change can be suppressed when the engine switches to the six-cylinder operation from the eight-cylinder operation, which produces more torque than the six-cylinder operation.

Similarly, when the engine is to switch from a six-cylinder operation to an eight-cylinder operation, the intake air amount is increased immediately before switching to sufficiently increase the torque during the six-cylinder operation. This makes it possible to suppress a torque change that may occur when the engine switches to the eight-cylinder operation, which produces more torque than the six-cylinder operation. Further, when the intake valves 36 are controlled to reduce the intake air amount immediately after switching to the eight-cylinder operation, it is possible to suppress a torque change that may occur immediately after switching to the eight-cylinder operation, which produces more torque than the six-cylinder operation.

When acceleration or deceleration is to be rapidly performed, the intake valves 36 are controlled in the same manner as described above. When, for instance, the engine is to switch from an eight-cylinder operation to a four-cylinder operation without conducting a six-cylinder operation, the intake valves 36 are controlled so that the intake air amount decreases immediately before switching from the eight-cylinder operation to the four-cylinder operation. Immediately after switching to the four-cylinder operation, the intake valves 36 are controlled so that the intake air amount is larger than usual. This makes it possible to suppress a torque change even when the number of combustion cylinders is changed in a discontinuous manner to suddenly increase or decrease the number of combustion cylinders.

When the number of cylinders is to be changed, the fourth embodiment optimally controls the lift amount, operating angle, and open/close timing of the intake valves 36 in accordance with switching timing as described above. Therefore, a torque change can be suppressed at the time of switching. Consequently, it is possible to inhibit driveability deterioration that may occur when the number of cylinders changes.

Fifth Embodiment

A fifth embodiment of the present invention will now be described. If an explosion stroke is performed at unequal intervals when an operation is conducted with a reduced number of cylinders, the fifth embodiment levels the torque by controlling the intake valves 36. The valve train configuration for the fifth embodiment of an internal combustion engine is the same as for the foregoing embodiments. Therefore, the intake valves 36 can be driven while the lift amount, operating angle, and open/close timing are optimized for each cylinder.

First of all, a control process that is performed when an eight-cylinder internal combustion engine 10 is employed will be described. As described in conjunction with the third embodiment, the cylinders (cylinders #1 to #8) of a V-type eight-cylinder internal combustion engine 10 perform an explosion stroke in the #1, #8, #4, #3, #6, #5, #7, and #2 order. When the eight-cylinder internal combustion engine 10 conducts a six-cylinder operation, it stops the explosion strokes of cylinders #3 and #2. Therefore, the six-cylinder operation is conducted by allowing the cylinders to perform an explosion stroke in the #1, #8, #4, #6, #5, and #7 order.

When an eight-cylinder operation is conducted, eight explosion strokes are performed over a crank angle of 720°. It means that an explosion stroke is performed at intervals of 90° crank angle. When a six-cylinder operation is conducted, the explosion stroke of cylinder #3 is stopped. Therefore, the crank angle between the explosion strokes of cylinder #4 and cylinder #6 is 180°. Further, since the explosion stroke of cylinder #2 is also stopped during a six-cylinder operation, the crank angle between the explosion strokes of cylinder #7 and cylinder #1 is 180°. The other explosion strokes are performed at intervals of 90° crank angle.

Therefore, the torque temporarily decreases between the explosion stroke of cylinder #4 and the explosion stroke of cylinder #6. Similarly, the torque temporarily decreases between the explosion stroke of cylinder #7 and the explosion stroke of cylinder #1.

When conducting a six-cylinder operation, therefore, the present embodiment performs the intake strokes for cylinders #4 and #7 by temporarily increasing the lift amount or operating angle of the intake valves 36 or by changing the open/close timing of the intake valves 36 so as to increase the intake air amount. This makes it possible to ensure that the intake air amount for cylinders #4 and #7 is larger than for the other cylinders. Further, control is exercised to increase the fuel injection amount for cylinders #4 and #7 in accordance with an increase in the intake air amount.

Exercising control as described above ensures that the torque produced by the explosion strokes of cylinders #4 and #7 is greater than the torque produced by the explosion strokes of the other cylinders. This makes it possible to suppress a temporary torque decrease between the explosion strokes of cylinders #4 and #6 and between the explosion strokes of cylinders #7 and #1. Thus, it is possible to level the torque. Consequently, good driveability can be provided even when the explosion strokes are performed at unequal intervals.

When, for instance, the torque of a particular cylinder is reduced by an ignition retarding scheme to level the torque, it is anticipated that fuel efficiency may deteriorate. However, when the aforementioned method is employed, the torque increases and becomes leveled, thereby making it possible to inhibit fuel efficiency deterioration.

When a four-cylinder operation is to be conducted, the present embodiment stops a combustion process in four out of eight cylinders, and stops cylinders so as to perform an explosion stroke at intervals of 180° crank angle. In this instance, the present embodiment stops cylinders so as to perform an explosion stroke at intervals of 180° crank angle in the #1, #4, #6, and #7 order or stops cylinders so as to perform an explosion stroke in the #8, #3, #5, and #2 order. In this case, the torque does not temporarily decrease because the explosion stroke is performed at equal intervals of 180° crank angle. Therefore, it is not necessary to exercise control for the purpose of increasing the intake air amount for a particular cylinder.

When a two-cylinder operation is to be conducted, similarly, the present embodiment stops a combustion process in six out of eight cylinders, and stops cylinders so as to perform an explosion stroke at intervals of 360° crank angle. In this instance, the present embodiment stops cylinders so as to perform an explosion stroke at two cylinders in the #1 and #6 order; in the #8 and #5 order; in the #4 and #7 order; or in the #3 and #2 order. In this case, the torque does not also temporarily decrease because the explosion stroke is performed at equal intervals of 360° crank angle. Therefore, it is not necessary to exercise control for the purpose of increasing the intake air amount for a particular cylinder.

Next, a control process that is performed when a six-cylinder internal combustion engine 10 is employed will be described. Even when the internal combustion engine 10 has six cylinders, the number of combustion cylinders is varied in accordance with the engine speed and load. Combustion occurs in all the six cylinders while an operation is conducted at a high engine speed and in a high-load region. When the engine speed and load decrease, control is exercised so that the number of combustion cylinders decreases to sequentially switch to a four-cylinder operation, a three-cylinder operation, and a two-cylinder operation.

As described in conjunction with the second embodiment, the cylinders (cylinders #1 to #6) of a V-type six-cylinder internal combustion engine 10 perform an explosion stroke in the #1, #2, #3, #4, #5 and #6 order. When the six-cylinder internal combustion engine 10 conducts a four-cylinder operation, it stops the explosion strokes of cylinders #3 and #6. Therefore, the four-cylinder operation is conducted by allowing the cylinders to perform an explosion stroke in the #1, #2, #4 and #5 order.

When a six-cylinder operation is conducted, six explosion strokes are performed over a crank angle of 720°. It means that an explosion stroke is performed at intervals of 120° crank angle. When a four-cylinder operation is conducted, the explosion stroke of cylinder #3 is stopped. Therefore, the crank angle between the explosion strokes of cylinder #2 and cylinder #4 is 240°. Further, since the explosion stroke of cylinder #6 is also stopped during a four-cylinder operation, the crank angle between the explosion strokes of cylinder #5 and cylinder #1 is 240°. The other explosion strokes are performed at intervals of 120° crank angle.

Therefore, the torque temporarily decreases between the explosion stroke of cylinder #2 and the explosion stroke of cylinder #4. Similarly, the torque temporarily decreases between the explosion stroke of cylinder #5 and the explosion stroke of cylinder #1.

When a six-cylinder internal combustion engine 10 conducts a four-cylinder operation, therefore, the present embodiment performs the intake strokes for cylinders #2 and #5 by temporarily increasing the lift amount or operating angle of the intake valves 36 or by changing the open/close timing of the intake valves 36 so as to increase the intake air amount. This makes it possible to ensure that the intake air amount for cylinders #2 and #5 is larger than for the other cylinders. Further, control is exercised to increase the fuel injection amount for cylinders #2 and #5 in accordance with an increase in the intake air amount.

Exercising control as described above ensures that the torque produced by the explosion strokes of cylinders #2 and #5 is greater than the torque produced by the explosion strokes of the other cylinders. This makes it possible to suppress a temporary torque decrease between the explosion strokes of cylinders #2 and #4. This also makes it possible to suppress a temporary torque decrease between the explosion strokes of cylinders #5 and #1. Thus, it is possible to level the torque all through the cycle. Consequently, good driveability can be provided.

When a six-cylinder internal combustion engine 10 conducts a three-cylinder operation, the present embodiment stops a combustion process in three out of six cylinders, and stops cylinders so as to perform an explosion stroke at intervals of 240° crank angle. In this instance, the present embodiment stops cylinders so as to perform an explosion stroke at intervals of 240° crank angle in the #1, #3 and #5 order in a bank or stops cylinders so as to perform an explosion stroke in the #2, #4 and #6 order in another bank. In this case, the torque does not temporarily decrease because the explosion stroke is performed at equal intervals of 240° crank angle. Therefore, it is not necessary to exercise control for the purpose of increasing the intake air amount for a particular cylinder.

When a two-cylinder operation is to be conducted, similarly, the present embodiment stops a combustion process in four out of six cylinders, and stops cylinders so as to perform an explosion stroke at intervals of 360° crank angle. In this instance, the present embodiment stops cylinders so as to perform an explosion stroke at two cylinders in the #1 and #4 order; in the #2 and #5 order; or in the #3 and #6 order. In this case, the torque does not also temporarily decrease because the explosion stroke is performed at equal intervals of 360° crank angle. Therefore, it is not necessary to exercise control for the purpose of increasing the intake air amount for a particular cylinder.

Next, a control process that is performed when a four-cylinder internal combustion engine 10 is employed will be described. Even when the internal combustion engine 10 has four cylinders, the number of combustion cylinders is varied in accordance with the engine speed and load. Combustion occurs in all the four cylinders while an operation is conducted at a high engine speed and in a high-load region. When the engine speed and load decrease, control is exercised so that the number of combustion cylinders decreases to sequentially switch to a three-cylinder operation and a two-cylinder operation.

As described in conjunction with the first embodiment, a four-cylinder internal combustion engine 10 perform an explosion stroke in the #1, #3, #4 and #2 order. When the four-cylinder internal combustion engine 10 conducts a three-cylinder operation, it stops the explosion strokes of cylinders

3. Therefore, the three-cylinder operation is conducted by allowing the cylinders to perform an explosion stroke in the #1, #4 and #2 order.

When a four-cylinder operation is conducted, four explosion strokes are performed over a crank angle of 720°. It means that an explosion stroke is performed at intervals of 180° crank angle. When a three-cylinder operation is conducted, the explosion stroke of cylinder #3 is stopped. Therefore, the crank angle between the explosion strokes of cylinder #1 and cylinder #4 is 360°. The other explosion strokes are performed at intervals of 180° crank angle.

Therefore, the torque temporarily decreases between the explosion stroke of cylinder #1 and the explosion stroke of cylinder #4.

When a four-cylinder internal combustion engine 10 conducts a three-cylinder operation, therefore, the present embodiment performs the intake strokes for cylinders #1 by temporarily increasing the lift amount or operating angle of the intake valves 36 or by changing the open/close timing of the intake valves 36 so as to increase the intake air amount. This makes it possible to ensure that the intake air amount for cylinders #1 is larger than for the other cylinders. Further, control is exercised to increase the fuel injection amount for cylinders #1 in accordance with an increase in the intake air amount.

Exercising control as described above ensures that the torque produced by the explosion strokes of cylinders #1 is greater than the torque produced by the explosion strokes of the other cylinders. This makes it possible to suppress a temporary torque decrease between the explosion strokes of cylinders #1. Thus, it is possible to level the torque all through the cycle. Consequently, good driveability can be provided.

When a four-cylinder internal combustion engine 10 conducts a two-cylinder operation, the present embodiment stops a combustion process in two out of four cylinders, and stops cylinders so as to perform an explosion stroke at intervals of 360° crank angle. In this instance, the present embodiment stops cylinders so as to perform an explosion stroke at intervals of 360° crank angle in the #1 and #4 order or stops cylinders so as to perform an explosion stroke in the #2 and #3 order. In this case, the torque does not temporarily decrease because the explosion stroke is performed at equal intervals of 360° crank angle. Therefore, it is not necessary to exercise control for the purpose of increasing the intake air amount for a particular cylinder.

If the explosion stroke is not performed at equal intervals when an operation is conducted with a reduced number of cylinders, the fifth embodiment controls the lift amount, operating angle, or open/close timing of the intake valves 36 as described above so that the intake air amount increases for a cylinder whose explosion stroke is performed before a period during which the explosion stroke interval increases. This makes it possible to level the torque. Consequently, driveability deterioration can be inhibited when an operation is conducted with a reduced number of cylinders.

INDUSTRIAL APPLICABILITY

Even when an operation is conducted with only a particular cylinder, the internal combustion engine valve train according to the present invention can inhibit driveability deterioration as described above, and is useful for various types of internal combustion engines.

The invention claimed is:
1. A valve train for an internal combustion engine that uses a plurality of motors to open/close valve discs of cylinders, wherein the plurality of motors include a plurality of intake motors for use in driving to open and close intake valves provided for each of the cylinders;
wherein at least one of the plural intake motors is commonly used for a group of cylinders constituted by plural cylinders where valve opening periods are not overlapped to each other;
wherein the internal combustion engine valve train further comprises valve driving means for driving the valve discs for a particular cylinder independently of the valve discs for the other cylinders;
wherein the number of cylinders used for combustion changes in a stepwise fashion in accordance with an operating state of an internal combustion engine; and
wherein when an explosion stroke is performed at unequal intervals with at least one cylinder being deactivated, an air intake amount for one active cylinder, which performs an explosion stroke earlier, of two active cylinders between which an explosion stroke interval becomes relatively wider than that between other cylinders is made larger than that for the other cylinder of the two active cylinders.

2. A valve train for an internal combustion engine according to claim 1, wherein the number of cylinders used for combustion changes in a discontinuous manner at a time of rapid acceleration or rapid deceleration.

3. A valve train for an internal combustion engine according to claim 1, wherein the valve driving means closes the valve discs for cylinders that is not used for combustion.

4. A valve train for an internal combustion engine according to claim 1, wherein, when a V-type eight-cylinder internal combustion engine conducts a six-cylinder operation by deactivating third and second cylinders, the intake air amount for fourth and seventh cylinders is made larger than that for other cylinders.

5. A valve train for an internal combustion engine according to claim 1, wherein, when a V-type six-cylinder internal combustion engine conducts a four-cylinder operation by deactivating third and sixth cylinders, the intake air amount for second and fifth cylinders is made larger than that for other cylinders.

6. A valve train for an internal combustion engine according to claim 1, wherein, when an inline four-cylinder internal combustion engine conducts a three-cylinder operation by deactivating a third cylinder, the intake air amount for a first cylinder is made larger than that for other cylinders.

7. A valve train for an internal combustion engine that uses a plurality of motors to open/close valve discs of cylinders, the internal combustion engine valve train comprising:
valve driving means for driving the valve discs for a particular cylinder independently of the valve discs for other cylinders;
wherein the number of cylinders used for combustion changes in a stepwise fashion in accordance with an operating state of an internal combustion engine;
wherein the valve driving means changes a lift amount, operating angle, or open/close timing of the valve discs;
wherein, when a number of cylinders used for combustion decreases, the valve discs are driven to decrease an intake air amount immediately before a decrease in the number of cylinders and increase the intake air amount immediately after the decrease in the number of cylinders; and
wherein, when the number of cylinders used for combustion increases, the valve discs are driven to increase the intake air amount immediately before an increase in the number of cylinders and decrease the intake air amount immediately after the increase in the number of cylinders.

8. A valve train for an internal combustion engine that uses a plurality of motors to open/close valve discs of cylinders, the internal combustion engine valve train comprising:

valve driving means for driving the valve discs for a particular cylinder independently of the valve discs for other cylinders;

wherein the number of cylinders used for combustion changes in a stepwise fashion in accordance with an operating state of an internal combustion engine; and wherein, if an explosion stroke is performed at unequal intervals when the number of cylinders used for combustion is changed, the valve driving means changes a lift amount, operating angle, or open/close timing of the valve discs for a cylinder that performs an explosion stroke immediately before a deactivated cylinder, thereby ensuring that the intake air amount for the former cylinder is larger than that for the other cylinders.

9. A valve train for an internal combustion engine that uses a plurality of motors to open/close valve discs of cylinders, wherein the plurality of motors include a plurality of intake motors for use in driving to open and close intake valves provided for each of the cylinders;

wherein at least one of the plural intake motors is commonly used for a group of cylinders constituted by plural cylinders where valve opening periods are not overlapped to each other;

wherein the internal combustion engine valve train further comprises a valve driving unit which drives the valve discs for a particular cylinder independently of the valve discs for other cylinders;

wherein the number of cylinders used for combustion changes in a stepwise fashion in accordance with an operating state of an internal combustion engine; and wherein when an explosion stroke is performed at unequal intervals with at least one cylinder being deactivated, an air intake amount for one active cylinder, which performs an explosion stroke earlier, of two active cylinders between which an explosion stroke interval becomes relatively wider than that between other cylinders is made larger than that for the other cylinder of the two active cylinders.

10. A valve train for an internal combustion engine that uses a plurality of motors to open/close valve discs of cylinders, the internal combustion engine valve train comprising:

a valve driving unit which drives the valve discs for a particular cylinder independently of the valve discs for other cylinders;

wherein the number of cylinders used for combustion changes in a stepwise fashion in accordance with an operating state of an internal combustion engine;

wherein the valve driving unit changes a lift amount, operating angle, or open/close timing of the valve discs;

wherein, when the number of cylinders used for combustion decreases, the valve discs are driven to decrease an intake air amount immediately before a decrease in the number of cylinders and increase the intake air amount immediately after the decrease in the number of cylinders; and wherein, when the number of cylinders used for combustion increases, the valve discs are driven to increase the intake air amount immediately before an increase in the number of cylinders and decrease the intake air amount immediately after the increase in the number of cylinders.

11. A valve train for an internal combustion engine that uses a plurality of motors to open/close valve discs of cylinders, the internal combustion engine valve train comprising:

a valve driving unit which drives the valve discs for a particular cylinder independently of the valve discs for other cylinders;

wherein the number of cylinders used for combustion changes in a stepwise fashion in accordance with an operating state of an internal combustion engine; and wherein, if an explosion stroke is performed at unequal intervals when the number of cylinders used for combustion is changed, the valve driving unit changes a lift amount, operating angle, or open/close timing of the valve discs for a cylinder that performs an explosion stroke immediately before a deactivated cylinder, thereby ensuring that an intake air amount for the former cylinder is larger than that for the other cylinders.

* * * * *